(12) United States Patent
Oonishi

(10) Patent No.: US 12,271,176 B2
(45) Date of Patent: Apr. 8, 2025

(54) NUMERICAL CONTROL DEVICE

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 336 days.

(21) Appl. No.: 17/759,982

(22) PCT Filed: Feb. 15, 2021

(86) PCT No.: PCT/JP2021/005487
§ 371 (c)(1),
(2) Date: Aug. 2, 2022

(87) PCT Pub. No.: WO2021/166843
PCT Pub. Date: Aug. 26, 2021

(65) Prior Publication Data
US 2023/0066756 A1 Mar. 2, 2023

(30) Foreign Application Priority Data
Feb. 20, 2020 (JP) .................. 2020-027522

(51) Int. Cl.
*G05B 19/409* (2006.01)
(52) U.S. Cl.
CPC .. *G05B 19/409* (2013.01); *G05B 2219/23053* (2013.01)
(58) Field of Classification Search
CPC ............ G05B 19/409; G05B 2219/23053
See application file for complete search history.

(56) References Cited

U.S. PATENT DOCUMENTS

| | | | |
|---|---|---|---|
| 2013/0211531 A1* | 8/2013 | Steines | A61F 2/3859 |
| | | | 623/20.14 |
| 2014/0228860 A1* | 8/2014 | Steines | A61B 34/10 |
| | | | 606/130 |
| 2019/0250581 A1* | 8/2019 | Hackl | G05B 19/4155 |

FOREIGN PATENT DOCUMENTS

| | | |
|---|---|---|
| CA | 2837808 A1 | 6/2015 |
| CN | 101971277 A | 2/2011 |
| CN | 110174874 A | 8/2019 |
| CN | 110501969 A | 11/2019 |
| JP | H06-190691 A | 7/1994 |
| JP | 2001-038578 A | 2/2001 |
| JP | 2011-005623 A | 1/2011 |

(Continued)

OTHER PUBLICATIONS

International Search Report issued in PCT/JP2021/005487; mailed Apr. 20, 2021.

*Primary Examiner* — Ziaul Karim
(74) *Attorney, Agent, or Firm* — Studebaker Brackett PLLC

(57) ABSTRACT

Provided is a numerical control device whereby the execution state of a program can be more intuitively confirmed. This numerical control device, which controls a machine tool on the basis of a program, comprises: a program execution unit having a prescribed function for executing a program in response to the rotation of a manual handle of the machine tool; an execution state identification unit that identifies the execution state of the program; and a haptic controller that generates haptic feedback in the manual handle on the basis of the prescribed function and the execution state of the program.

3 Claims, 4 Drawing Sheets

(56) References Cited

FOREIGN PATENT DOCUMENTS

| | | |
|---|---|---|
| JP | 2014-050950 A | 3/2014 |
| JP | 2017-117278 A | 6/2017 |
| WO | 2015/129516 A1 | 9/2015 |

* cited by examiner

NUMERICAL CONTROL DEVICE

TECHNICAL FIELD

The present invention relates to a numerical control device.

BACKGROUND ART

Conventionally, technology for generating sound and vibrations according to load has been known in machine tools which perform axis feed by a manual handle (for example, refer to Patent Document 1). Patent Document 1 discloses a machine tool which includes a control means that varies the type of sound and vibration of a communicating means according to the magnitude of a detected load by a load detecting means.
Patent Document 1: Japanese Unexamined Patent Application, Publication No. H06-190691

DISCLOSURE OF THE INVENTION

Problems to be Solved by the Invention

A machine tool may have a function of executing a program according to rotation of a manual handle. When the machine tool executes such a function, the operator must watch a screen displaying the program in order to confirm the execution state of the program. For this reason, in the numerical control device controlling the machine tool, a numerical control device has been desired whereby the execution state of the program can be confirmed more intuitively.

Means for Solving the Problems

A numerical control device according to the present disclosure controls a machine tool based on a program, the numerical control device including: a program execution section having a predetermined function of executing the program according to rotation of a manual handle of the machine tool; an execution state specification section which specifies an execution state of the program; and a haptic control section which causes haptic feedback to be generated in the manual handle based on the predetermined function and the execution state of the program.

Effects of the Invention

According to the present invention, it is possible to more intuitively confirm the execution state of a program.

PREFERRED MODE FOR CARRYING OUT THE INVENTION

Figure 1:
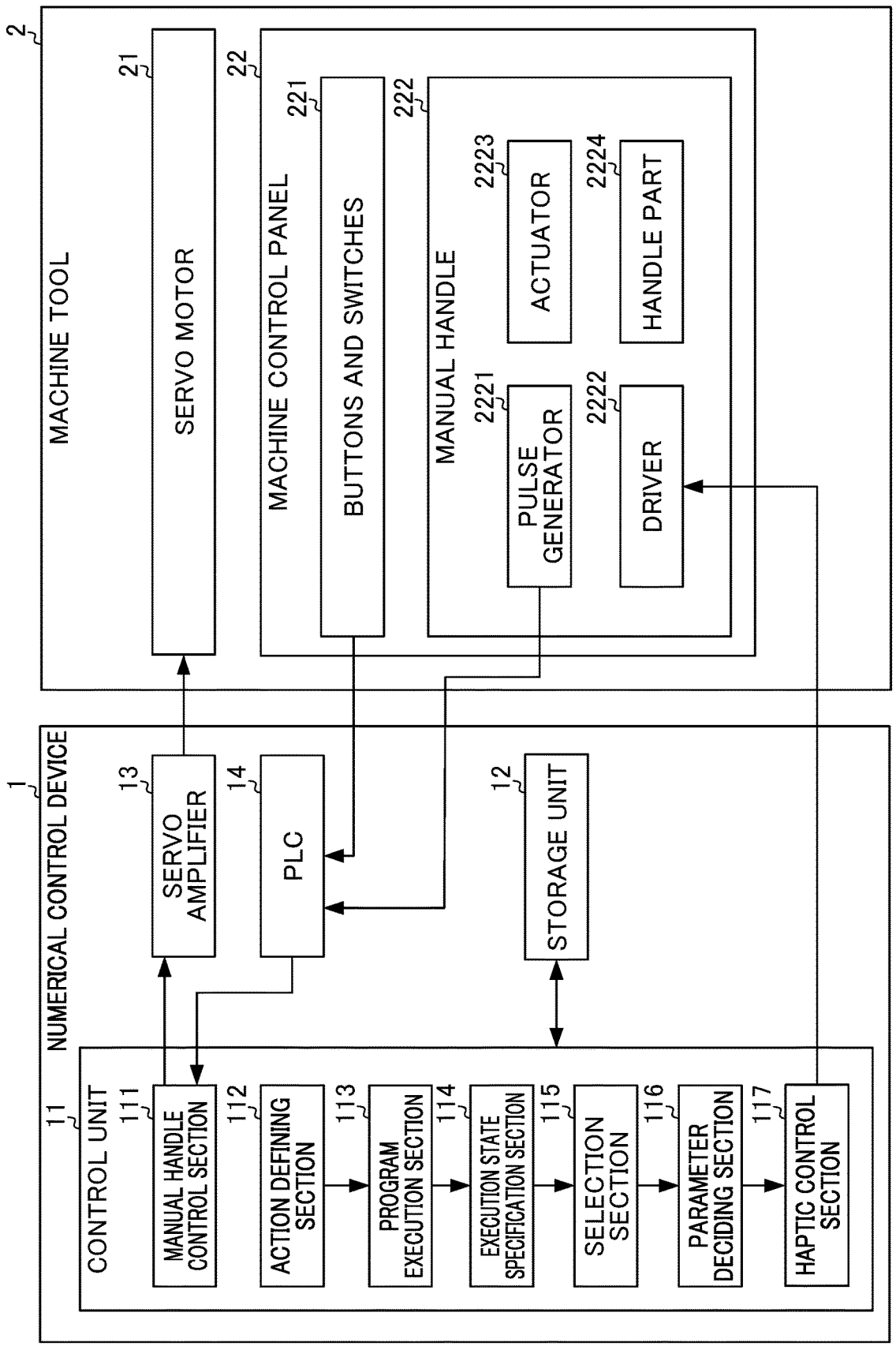
FIG. 1 is a view showing the configuration of a numerical control device and a machine tool according to the present embodiment.

Hereinafter, an example of an embodiment of the present invention will be explained. FIG. 1 is a view showing configurations of a numerical control device 1 and a machine tool 2. The numerical control device 1 and machine tool 2 are connected by a bus (not shown) or the like, and the machine tool 2 operates in accordance with control of the numerical control device 1.

As shown in FIG. 1, the numerical control device 1 includes a control unit 11, a storage unit 12, a servo amplifier 13, and a PLC (Programmable Logic Controller) 14.

The control unit 11 is a processor such as a CPU (Central Processing Unit), and functions as a manual handle control section 111, action defining section 112, program execution section 113, execution state specification section 114, selection section 115, parameter deciding section 116 and haptic control section 117, by executing programs stored in the storage unit 12.

The storage unit 12 is configured by ROM (read only memory), RAM (random access memory), non-volatile memory, hard disk drive, etc., and stores various data. For example, the storage unit 12 stores action definition data, parameters, etc. described later.

The servo amplifier 13 amplifies movement commands of axes received from the control unit 11, and drives the servo motor 21 of the machine tool 2. The PLC 14 receives M (auxiliary) function signals, S (spindle speed control) function signals, T (tool selection) function signals, etc. from the control unit 11. Then, the PLC 14 processes these signals by sequence programs, and outputs the processed output signals to the machine tool 2. The PLC 14 controls pneumatic equipment, hydraulic equipment, electromagnetic actuators, etc. in the machine tool 2 according to the output signals.

In addition, the PLC 14 receives various signals such as button signals, switch signals, and manual handle signals of the machine control panel 22 of the machine tool 2, and sequences the various signals received. Then, the PLC 14 sends the various signals thus sequenced to the control unit 11 via the bus.

The machine tool 2 includes the servo motor 21 and machine control panel 22. It should be noted that, in the present disclosure, other configurations of the machine tool 2 are omitted for simplification of explanation, and the machine tool 2 has the configuration of a general machine tool.

The servo motor 21 drives an axis according to the movement command of the axis received from the servo amplifier 13. The machine control panel 22 includes buttons and switches 221, and the manual handle 222. The buttons and switches 221 include mechanical buttons and switches. The buttons and switches 221 output button signals and switch signals to the PLC 14, when the mechanical buttons or switches are pressed.

The manual handle 222 moves one or a plurality of axes according to manual operation. The manual handle 222 includes a pulse generator 2221, driver 2222, actuator 2223 and handle part 2224.

The pulse generator 2221, when causing the handle unit 2224 to rotate in the + direction or − direction, outputs a pulse signal according to this rotation. This pulse signal is a two-phase pulse for determining the rotation direction, and is sent to the control unit 11 via the bus. Then, the manual handle control section 111 of the control unit 11 sends the movement command of an axis of the machine tool 2 to the servo amplifier 13 based on this pulse signal.

The driver 2222 receives control signals from the haptic control section 117 of the control unit 11, and outputs a drive signal for generating haptic feedback to the actuator 2223.

The actuator 2223 is driven by the drive signal from the driver 2222, and generates a haptic feedback. The actuator 2223, for example, may be an electric motor, an electromagnetic actuator, a shape-memory alloy, an electroactive polymer, a solenoid, an eccentric motor, a linear resonance actuator, a piezoelectric actuator or the like. In addition, the actuator 2223 may be configured by a plurality of different actuators.

The handle part 2224 is configured by a mechanical manual handle, for example, and is operated by an operator.

The manual handle control section 111 receives a pulse signal outputted from the pulse generator 2221. Then, the manual handle control section 111 sends a movement command of an axis of the machine tool 2 to the servo amplifier 13 based on the pulse signal.

The action defining section 112 sets action definition data defining the haptic feedback to be generated in the manual handle 222. The action definition data associates a predetermined function, a program execution state, and a type of haptic feedback. The action definition data is stored in the storage unit 12.

The program execution section 113 has a predetermined function of executing a program according to rotation of the manual handle 222 of the machine tool 2.

The program execution section 113 can move forward execution of a program by forward rotating the manual handle 222, whereby axis movement of the machine tool 2 moves forward in accordance with this. On the other hand, the program execution section 113 can reverse the execution of the program by reverse rotating the manual handle 222, whereby the axis movement of the machine tool 2 moves backwards in accordance with this. The operator can thereby correct and check the created program. In addition, it is possible to execute a program at a speed synchronized with the rotation speed of the manual handle 222.

The execution state specification section 114 specifies the execution state of a program. More specifically, the execution state specification section 114 specifies which execution state the program in execution is. For example, in the case of the predetermined function being a manual handle retrace function, the execution state specification section 114 specifies the in-execution block and block end of the program. In addition, the execution state specification section 114 may specify a command feedrate of a block of the program.

The selection section 115 selects a type of haptic feedback based on the action definition data, predetermined function and execution state of the program. For example, the selection section 115 selects, as the type of haptic feedback, a detent-like resistance tactile sense associated with predetermined function in the action definition data and the program end point, from the information of the in-execution block and block end point.

The parameter deciding section 116 decides parameters related to haptic feedback, based on the type of haptic feedback selected by the selection section 115. Herein, the type of haptic feedback is associated with the parameters related to haptic feedback. The type of haptic feedback and parameters related to haptic feedback are decided based on the information stored in the storage unit 12 and the program execution state.

The parameters related to haptic feedback include the magnitude, direction, frequency, duration, amplitude, intensity, density, etc. of the haptic feedback.

The haptic control section 117 causes haptic feedback to be generated in the manual handle based on the predetermined function and the execution state of the program. More specifically, the haptic control section generates a control signal using the parameters decided by the parameter deciding section 116 based on the predetermined function and the execution state of the program, and notifies the control signal to the driver 2222. The haptic control section 117 thereby causes haptic feedback to be generated in the manual handle 222.

Figure 2:
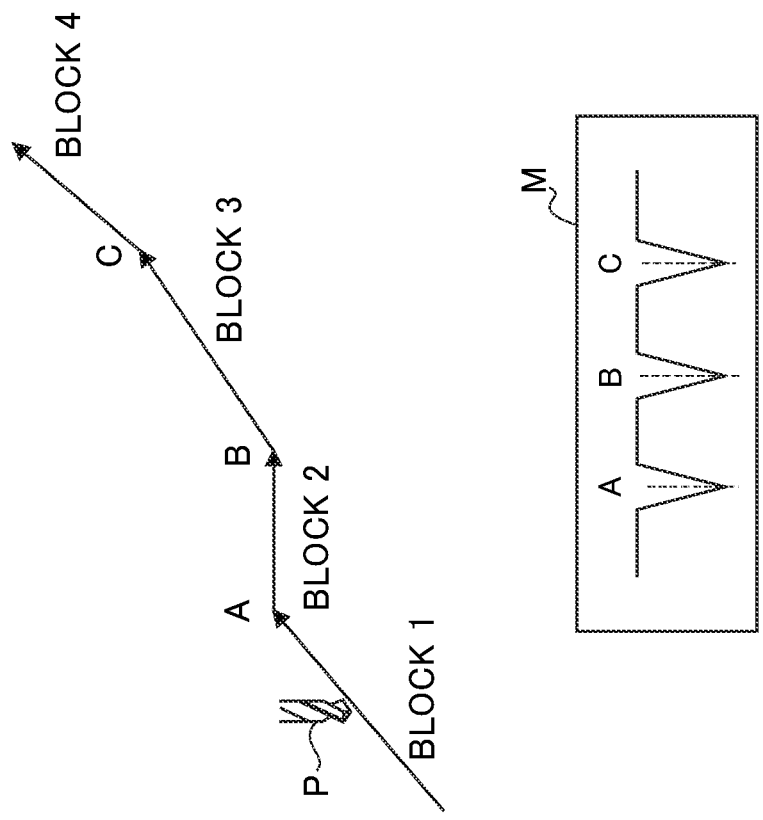
FIG. 2 is a view showing an example of a program execution state.
Figure 2:
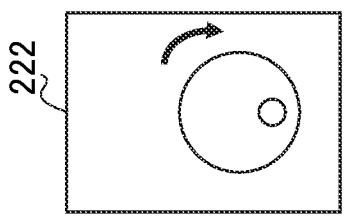

FIG. 2 is a view showing an example of a program execution state. The example of FIG. 2 shows a program execution state in the case of the predetermined function being a manual handle retrace function. As shown in FIG. 2, in the case of the execution state specifying section 114 specifying the respective end points A, B and C of the blocks 1, 2 and 3 of the program, the selection section 115 selects, as the type of haptic feedback, the detent-like resistance tactile sense associated with the manual handle retrace function in the action definition data and program end point.

Then, the parameter deciding section 116 decides the parameters related to haptic feedback based on the type of haptic feedback selected by the selection section 115. The haptic control section 117 generates the detent-like resistance tactile sense using the decided parameters, by way of haptic feedback.

For example, as shown in the exemplary control signal M in FIG. 2, the haptic control section 117 changes the resistance tactile sense of haptic feedback so that the resistance tactile sense decreases at end points A, B and C. In addition, the haptic control section 117 changes the resistance tactile sense of the haptic feedback so that the resistance tactile sense becomes greater at positions other than the end points A, B and C than at the end points A, B and C.

By generating haptic feedback so as to decrease the resistance sense at end points of blocks of the program in this way, the operator can intuitively understand the execution state of the program.

Figure 3:
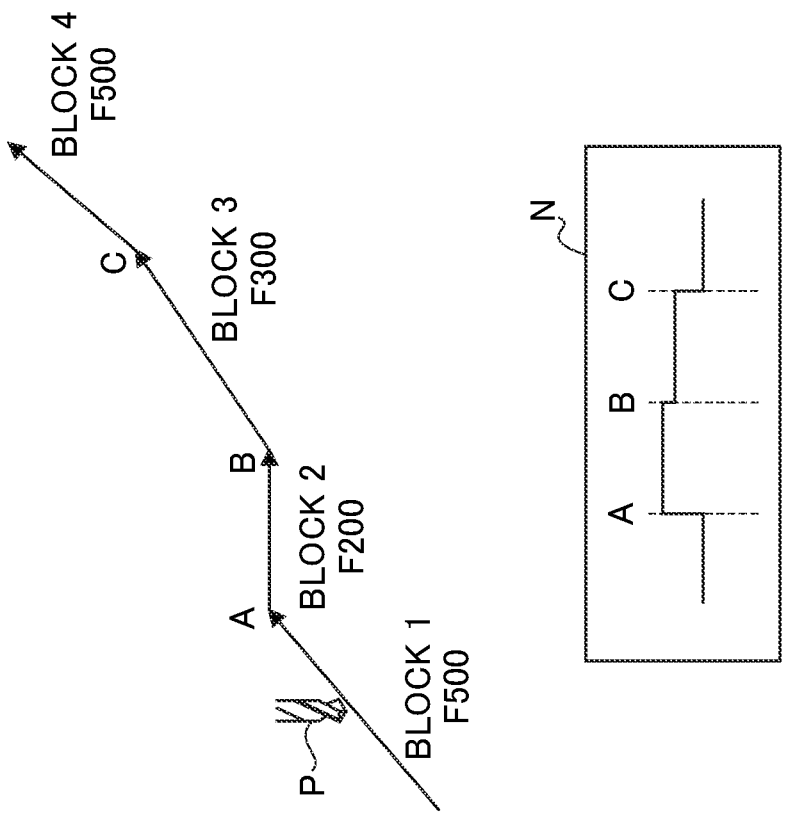
FIG. 3 is a view showing an example of a program execution state.
Figure 3:
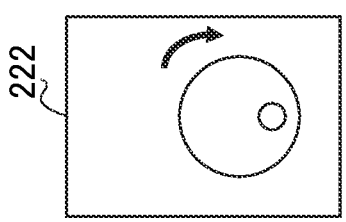

FIG. 3 is a view showing an example of a program execution state. The example of FIG. 3 shows a program execution state in the case of the predetermined function being the manual handle retrace function. As shown in FIG. 3, in the case of the execution state specifying section 114 specifying the command feedrate of a block of the program, the selection section 115 selects, as the type of haptic feedback, resistance tactile sense associated with the manual handle retrace function in the action definition data and the command feedrate of a block of the program.

Then, the parameter deciding section 116 decides parameters related to haptic feedback, based on the type of haptic feedback selected by the selection section 115. The haptic control section 117 generates the resistance tactile sense according to the command feedrate by haptic feedback, using the decided parameters.

For example, as shown in the exemplary control signal N of FIG. 3, at block 1 of the program, the command feedrate is F500, which is a relatively fast speed. In this case, the haptic control section 117 changes the resistance tactile sense of haptic feedback so that the resistance tactile sense of haptic feedback becomes relatively small. In block 2 of the program, the command feedrate is F200, which is a slower speed than block 1. In this case, the haptic control section 117 changes the resistance tactile sense of haptic feedback so that the resistance tactile sense of haptic feedback becomes larger than block 1.

At block 3 of the program, the command feedrate is F300, which is a speed faster than block 1 and slower than block 2. In this case, the haptic control section 117 changes the resistance tactile sense of haptic feedback so that the resistance tactile sense of haptic feedback is greater than block 1 and smaller than block 2. At block 4 of the program, the command feedrate if F500, which is the same as block 1. In this case, the haptic control section 117 changes the resistance tactile sense of haptic feedback so as to be the same resistance tactile sense as block 1.

In the case of the command feedrate of a block of the program being fast in this way, the resistance tactile sense of haptic feedback is made small, and in the case of the command feedrate of a block of the program being slow, the resistance tactile sense of haptic feedback is made large. The operator can thereby intuitively understand the command feedrate of a block of the program.

It should be noted that, in the aforementioned embodiment, in the case of the command feedrate of a block of the program being fast, the resistance tactile sense of haptic feedback is made small, and in the case of the command feedrate of a block of the program being slow, the resistance tactile sense of haptic feedback is made large; however, the resistance tactile sense of haptic feedback may be made large in the case of the command feedrate of a block of the program being fast, and the resistance tactile sense of haptic feedback may be made small in the case of the command feedrate of a block of the program being slow. In addition, the haptic control section 117 may generate another mode of haptic feedback whereby the user can identify a specific position of the manual handle 222, instead of the aforementioned modes of haptic feedback.

Figure 4:
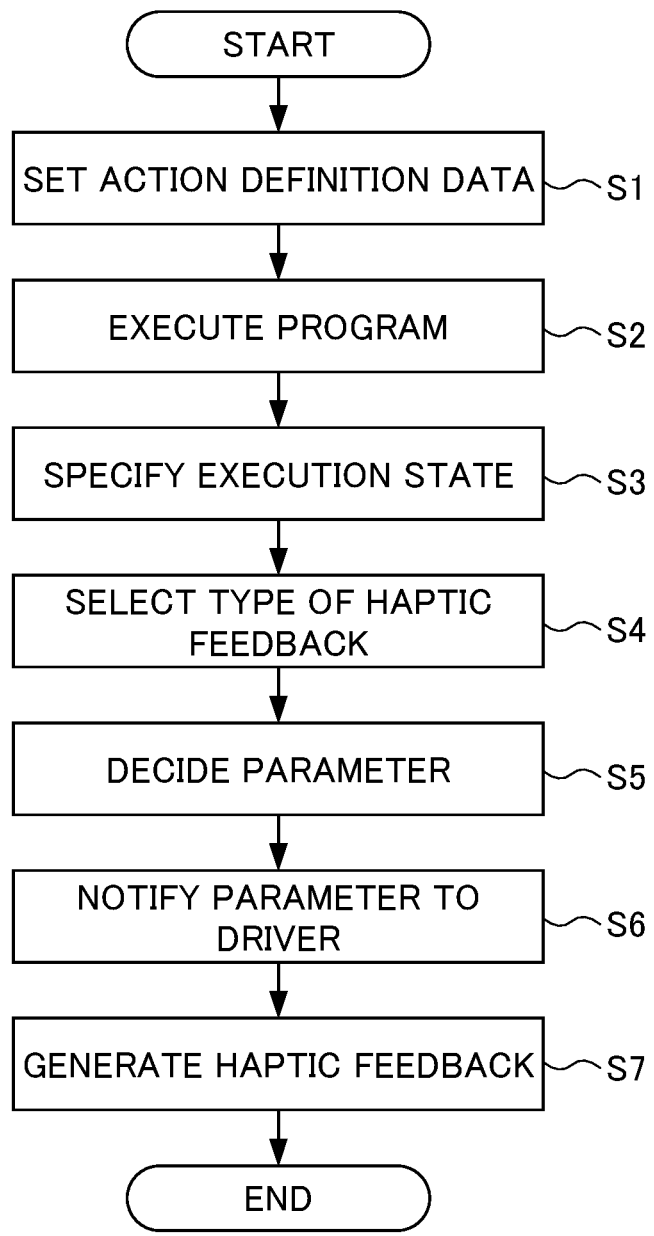
FIG. 4 is a flowchart showing the flow of processing of a numerical control device.

FIG. 4 is a flowchart showing the flow of processing of the numerical control device 1. In Step S1, the action defining section 112 sets the action definition data defining haptic feedback to be generated in the manual handle 222. In Step S2, the program execution section 113 executes a program according to rotation of the manual handle 222 of the machine tool 2 in a predetermined function.

In Step S3, the execution state specification section 114 specifies the execution state of the program in execution. In Step S4, the selection section 115 selects the type of haptic feedback based on the action definition data, predetermined function and execution state of the program.

In Step S5, the parameter deciding section 116 decides the parameter related to haptic feedback, based on the type of haptic feedback selected by the selection section 115. In Step S6, the haptic control section 117 generates a control signal using the parameter decided by the parameter deciding section 116, and notifies the control signal to the driver 2222.

In Step S7, the driver 2222 receives the control signal from the haptic control section 117 of the control unit 11, and outputs a drive signal for generating haptic feedback to the actuator 2223. Then, the actuator 2223 is driven according to the drive signal from the driver 2222, and generates haptic feedback.

As explained above, according to the present embodiment, the numerical control device 1 controlling the machine tool 2 based on a program includes: the program execution section 113 having a predetermined function of executing a program according to rotation of the manual handle 222 of the machine tool 2; the execution state specification section 114 which specifies the execution state of the program; and the haptic control section 117 which causes haptic feedback to be generated in the manual handle 222 based on the predetermined function and execution state of the program. By causing haptic feedback to be generated in the manual handle 222 in this way, the operator can intuitively understand the execution state of the program.

In addition, the haptic control section 117 causes the resistance tactile sense of haptic feedback to change at the end point of a block of the program. The operator can thereby intuitively understand the end point of a block of the program.

In addition, the haptic control section 117 causes the haptic feedback to change according to the command feedrate of the program. The operator can thereby intuitively understand the command feedrate of the program.

In addition, the predetermined function includes a manual handle retrace function or handle synchronous feed function. The operator can thereby intuitively understand the execution state of the program in these functions.

In addition, the numerical control device 1 further includes: the action defining section 112 which sets the action definition data defining the haptic feedback outputted to the manual handle 222; the selection section 115 which selects the type of haptic feedback based on the action definition data, predetermined function and execution state of the program; and the parameter deciding section 116 which decides parameters related to haptic feedback based on the type of haptic feedback, in which the haptic control section 117 causes haptic feedback to be generated in the manual handle 222 using the parameters. The numerical control device 1 can thereby cause haptic feedback to be appropriately generated in the manual handle 222.

Although an embodiment of the present invention has been explained above, the present invention is not to be limited to the aforementioned embodiment. In addition, the effects described in the present embodiment are merely listing the most preferred effects produced from the present invention, and the effects from the present invention are not to be limited to those described in the present embodiment.

EXPLANATION OF REFERENCE NUMERALS 1 numerical control device
2 machine tool
11 control unit
12 storage unit
13 servo amplifier
14 PLC
21 servo motor
22 machine control panel
111 manual handle control section
112 action defining section
113 program execution section
114 execution state specification section
115 selection section
116 parameter deciding section
117 haptic control section
221 buttons and switches
222 manual handle
2221 pulse generator
2222 driver
2223 actuator
2224 handle part

The invention claimed is:
1. A numerical control device for controlling a machine tool based on a program, the numerical control device comprising:
a processor, wherein the processor is configured to:
have a predetermined function of executing the program according to rotation of a manual handle of the machine tool;
specify an execution state of the program;
cause haptic feedback to be generated in the manual handle based on the predetermined function and the execution state of the program;
set action definition data that defines the haptic feedback to be outputted to the manual handle;

select a type of the haptic feedback based on the action definition data, the predetermined function, and the execution state of the program; and decide a parameter related to the haptic feedback based on the type of the haptic feedback, wherein the processor specifies a command speed of a block of the program, and selects, as the type of the haptic feedback, resistance tactile sense associated with a manual handle retrace function in the action definition data and the command speed of a block of the program, wherein the processor generates the resistance tactile sense according to the command speed by the haptic feedback, using the decided parameter.

2. The numerical control device according to claim 1, wherein the processor causes the resistance tactile sense of the haptic feedback to change at an end point of the block of the program.

3. The numerical control device according to claim 1, wherein the processor causes the haptic feedback to change according to a command feedrate of the program.

* * * * *